(12) United States Patent
Copeland et al.

(10) Patent No.: US 10,253,827 B1
(45) Date of Patent: Apr. 9, 2019

(54) CLUTCH APPLY PISTON ASSEMBLY FOR AUTOMOTIVE TRANSMISSIONS

(71) Applicant: Sonnax Transmission Company, Bellow Falls, VT (US)

(72) Inventors: Brian T. Copeland, Keene, NH (US); Gregg A. Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 466 days.

(21) Appl. No.: 14/965,490

(22) Filed: Dec. 10, 2015

Related U.S. Application Data

(60) Provisional application No. 62/089,890, filed on Dec. 10, 2014.

(51) Int. Cl.
*F16D 13/54* (2006.01)
*F16D 25/0638* (2006.01)

(52) U.S. Cl.
CPC ......... *F16D 25/0638* (2013.01); *F16D 13/54* (2013.01)

(58) Field of Classification Search
CPC ...... F16D 25/0638; F16D 13/54; F16D 25/06; F16D 13/40; F16D 13/52; F16D 13/70; F16D 2250/0084; F16D 2300/02; F16D 2300/12
See application file for complete search history.

(56) References Cited

U.S. PATENT DOCUMENTS

| | | | |
|---|---|---|---|
| 5,749,451 A | 5/1998 | Grochowski | |
| 7,040,474 B2 | 5/2006 | Pedersen et al. | |
| 7,320,391 B2 | 1/2008 | Zagrodzki et al. | |
| 7,497,312 B2 | 3/2009 | Braford, Jr. | |
| 2010/0084242 A1* | 4/2010 | Lewis | F16D 13/52 192/111.15 |
| 2011/0061984 A1* | 3/2011 | Grosspietsch | F16D 13/52 192/70.11 |

FOREIGN PATENT DOCUMENTS

JP        5053052 B2    10/2012

* cited by examiner

*Primary Examiner* — Jacob S. Scott
*Assistant Examiner* — Lori Wu
(74) *Attorney, Agent, or Firm* — Downs Rachlin Martin PLLC

(57) ABSTRACT

A piston apply ring for providing a more uniform load distribution from an apply piston to clutch plates in a clutch apply piston assembly, effectively increasing the lifetime of various components of the clutch apply piston assembly, is disclosed. An L-shaped cross-sectional shape of the piston apply ring helps locate the apply ring on the clutch apply piston and prevents torsional movement between the apply ring and the apply piston. Various alternative embodiments are disclosed.

15 Claims, 9 Drawing Sheets

CLUTCH DISENGAGED

CLUTCH DISENGAGED

CLUTCH ENGAGED

CLUTCH ENGAGED

CLUTCH DISENGAGED

CLUTCH ENGAGED

CLUTCH DISENGAGED
(PRIOR ART)

CLUTCH ENGAGED
(PRIOR ART)

CLUTCH APPLY PISTON ASSEMBLY FOR AUTOMOTIVE TRANSMISSIONS

RELATED APPLICATION DATA

This application claims the benefit of priority of U.S. Provisional Patent Application Ser. No. 62/089,890, filed on Dec. 10, 2014, and titled "CLUTCH APPLY PISTON ASSEMBLY FOR AUTOMOTIVE TRANSMISSIONS," which is incorporated by reference herein in its entirety.

FIELD OF THE INVENTION

The present invention generally relates to the field of vehicular transmissions. In particular, the present invention is directed to a clutch apply piston assembly for automotive transmissions.

BACKGROUND

Automatic and semi-automatic automotive transmissions typically utilize one or more internal clutch assemblies to transfer input torque from the vehicle's engine into transmission output torque at varying output speeds. With reference to FIGS. 13 and 14, a common example of transmission clutch assembly prior art is illustrated. FIG. 13 shows clutch assembly 1 in a disengaged mode of operation. FIG. 14 shows an enlarged view of clutch assembly 1 in an engaged mode of operation. Clutch assembly 1 includes a clutch housing 10, clutch apply piston 20, clutch apply cushion plate 30, multiple clutch reaction plates 40, multiple clutch friction plates 50, backing plate 60, and backing plate retaining ring 70. It should be noted that in some examples of prior art, clutch apply cushion plate 30 is not used or required.

Rotation and axial translation of the clutch assembly components occur about and along central axis 80. Clutch apply cushion plate 30, clutch reaction plates 40, and backing plate 60 have external teeth on their outer perimeters that engage corresponding internal teeth in clutch housing 10. Clutch friction plates 50 have an inner and outer diameter with internal teeth on their inner diameters that engage corresponding external teeth on an outer surface of a driven member, e.g., an intermediate or output shaft or housing (not shown for clarity). As partially illustrated in FIG. 14, clutch friction plates 50 typically consist of an intermediate, internally-toothed disk 52 with one or more layers of friction material 51 bonded to the disk.

Clutch reaction plates 40 and clutch friction plates 50 are interleaved to create a clutch pack 100. When disengaged, as shown in FIG. 13, there is a clearance L1 between clutch pack 100 and backing plate 60. Therefore, in the disengaged mode there is no axial force applied to clutch pack 100. In this mode there is no significant amount of frictional force developed within clutch pack 100, and, as such, clutch reaction plates 40 are free, absent any other outside forces, to rotate relative to clutch friction plates 50. Hence, in the disengaged mode, no torque is transmitted from the driving member, in this case clutch housing 10, to the driven member.

When clutch assembly 1 is in the engaged mode, as depicted in FIG. 14, force is applied axially to clutch pack 100 via clutch apply piston 20. When clutch apply piston 20 is applied, forcing clutch reaction plates 40 and clutch friction plates 50 together, the clutch reaction plates engage the clutch friction plates such that rotational forces from the central shaft are transmitted to clutch housing 10 (or vice versa). As the force is applied, clutch apply cushion plate 30 and clutch pack 100 translate axially until resisted by backing plate 60. Axial translation of backing plate 60 is limited by backing plate retaining ring 70, which is installed in a fixed groove in clutch housing 10. As the clutch components meet resistance from backing plate 60, the plates become compressed against each other. This compression generates frictional force between clutch reaction plates 40, backing plate 60, and clutch friction plates 50. Once engaged in this fashion, clutch pack 100 acts as a frictional drive coupling between a driving member, in this case clutch housing 10, and the driven member.

In order to achieve optimum clutch performance, proper face-to-face contact between the clutch components needs to be maintained during clutch engagement. Maximum contact surface area and even load distribution on the clutch plate friction contact surfaces are critical in order to minimize clutch slippage and/or the amount of heat generated due to friction. As the optimum contact conditions become compromised, excessive clutch slippage and heat generation tend to increase, leading to rapid clutch plate wear and the resultant poor clutch performance and durability.

SUMMARY OF THE DISCLOSURE

In one implementation, a piston apply ring for a clutch assembly, the clutch assembly including an apply piston, a clutch pack having clutch plates, and a backing plate, the apply piston having an outer diameter and a contact surface for applying force to the clutch pack, is provided. The piston apply ring may include: an annular portion having a central longitudinal axis, an outer diameter, an inner diameter, an apply piston side and a clutch pack side; and a cylindrical portion extending from the apply piston side of the annular portion and having an inner diameter that is greater than the annular portion inner diameter and substantially the same as the apply piston outer diameter, wherein the clutch pack side of the annular portion has a surface area that is greater than the contact surface of the apply piston, the piston apply ring being configured to uniformly transmit a force from the apply piston to the clutch pack.

In another implementation, a kit for minimizing or eliminating clutch plate distortion in a clutch assembly, the clutch assembly including a first apply piston designed and configured to be translated along a central axis, is provided. The kit may comprise: a piston apply ring; and a second apply piston designed and configured to, along with the piston apply ring, replace the first apply piston, wherein the combined axial extent of the piston apply ring and the second apply piston along the central axis after being installed in the clutch assembly in place of the first apply piston is substantially equivalent to the axial extent of the first apply piston along the central axis when it is installed in the clutch assembly without the piston apply ring and second apply piston.

In still another implementation, a method of installing a piston apply ring and clutch apply piston in a clutch apply piston assembly such that the piston apply ring cooperates with the clutch apply piston, the clutch assembly including a first clutch apply piston designed and configured to be translated along a central axis, is provided. The method may comprise: removing the first clutch apply piston; and installing a second clutch apply piston and the piston apply ring, wherein the combined axial extent of the piston apply ring and the second clutch apply piston along the central axis after being installed in the clutch assembly in place of the first clutch apply piston is substantially equivalent to the axial extent of the first clutch apply piston along the central axis when it is installed in the clutch assembly without the piston apply ring and second clutch apply piston.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 13:
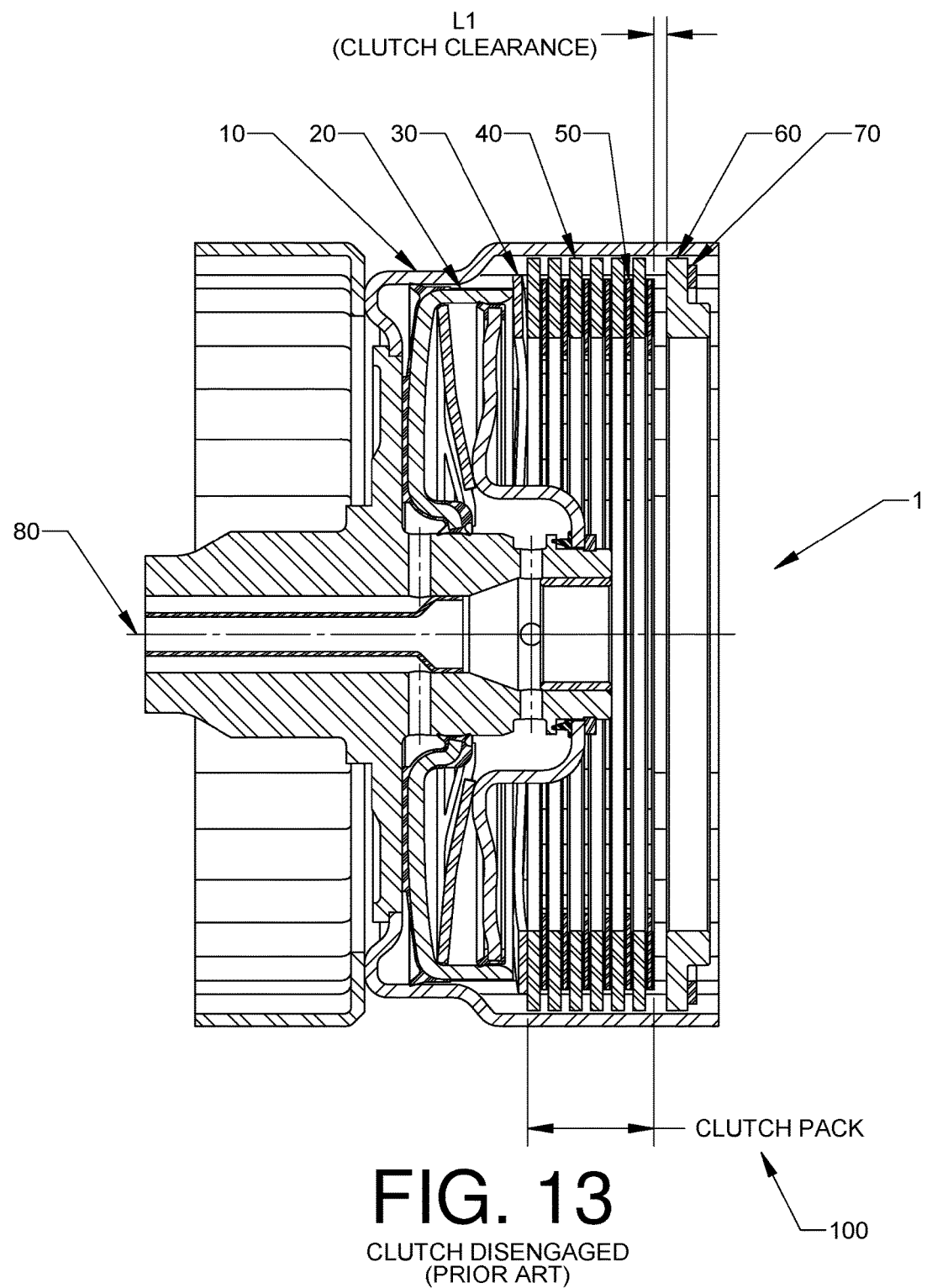
FIG. 13 is a cross sectional view depicting a common example of prior art relating to a clutch apply piston assembly with the clutch assembly shown in the disengaged mode.
Figure 14:
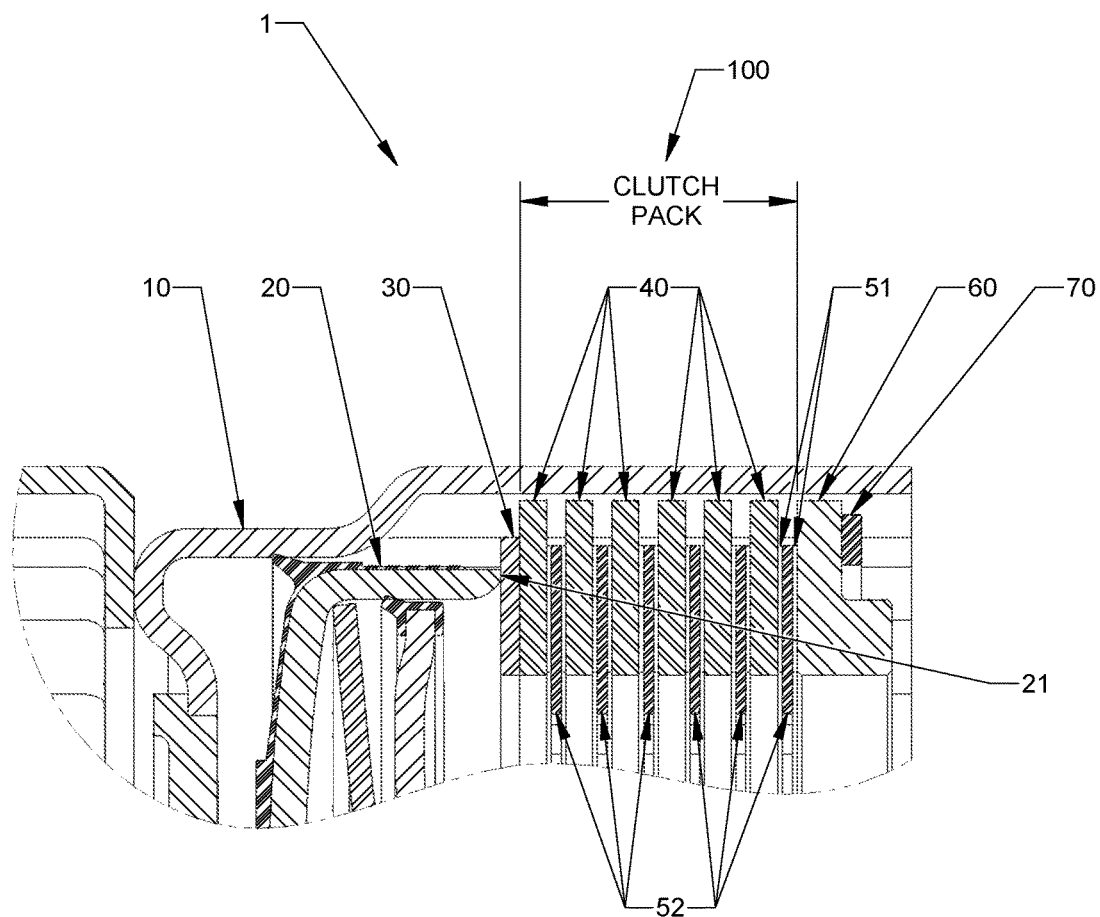
FIG. 14 is a partial and enlarged cross sectional view of the prior art shown in FIG. 13 with the clutch assembly shown in the engaged mode.

Clutch reaction plates 40 like those shown in FIGS. 13-14 have a tendency to warp, resulting in axisymmetric and non-axisymmetric bending due to temperature differentials and uneven forces. Due to apply piston 20 being stamped from sheet metal and, as such, contact point surface 21 of the apply piston (see FIG. 14) having a reduced area relative to other apply pistons in the prior art, contact point surface 21 (FIG. 14) of the apply piston can contribute to temperature differentials due to hot spots or "hot spotting" at the contact point resulting from the relatively small surface area of the apply piston contact point, and the contact point can act as a fulcrum, causing plate deflection. In order to resolve these issues, aspects of the present disclosure include improved clutch apply piston assemblies providing improved contact between mating components of the assembly to improve clutch performance and increase the lifetime of clutch components.

From research and testing it has been observed that poor clutch reaction plate contact with adjacent friction plates can produce clutch plate distortion, often causing permanent deformation such as out of plane bending. Two primary modes of out of plane bending have been observed: axisymmetric, in which the disc develops a conical shape, colloquially referred to as "coning;" and non-axisymmetric, in which the disc develops a sinusoidal rippling around its circumference, colloquially referred to as a "pringling" bending mode. See, for example, Audebert, Nadine, Barber, J. R. and Zagrodzki, P., "BUCKLING OF AUTOMATIC TRANSMISSION CLUTCH PLATES DUE TO THERMOELASTIC/PLASTIC RESIDUAL STRESSES," Journal of Thermal Stresses, 21:3, 309-326, published in 1998, which is incorporated by reference herein in its entirety.

While not intending to be limited by any one particular theory, it is believed that a primary cause of both distortion modes is internal stresses created by temperature differentials across the contact surfaces of and within the clutch plates. As the clutch plates distort in this fashion, the undesirable contact conditions are further aggravated, leading to even greater heat generation and distortion. In the course of testing and research performed by the present inventors, it was observed that one key cause of improper contact and undesirable heat generation in some assemblies, such as the example prior art assembly 1 discussed above, may be caused by the narrow surface 21 of clutch apply piston 20 that is in contact with either clutch apply cushion plate 30 and/or clutch pack 100. As mentioned above, having piston apply forces concentrated in such a narrow band may result in increased heat being generated within this band, sometimes resulting in hot spotting of the clutch plates and uneven heat and load distribution beyond this zone. Narrow piston surface 21 also can act as a fulcrum about which the mating clutch plates can torsionally deflect out of plane when under load. This torsional deflection can accentuate the tendency for clutch plate coning.

Figure 1:
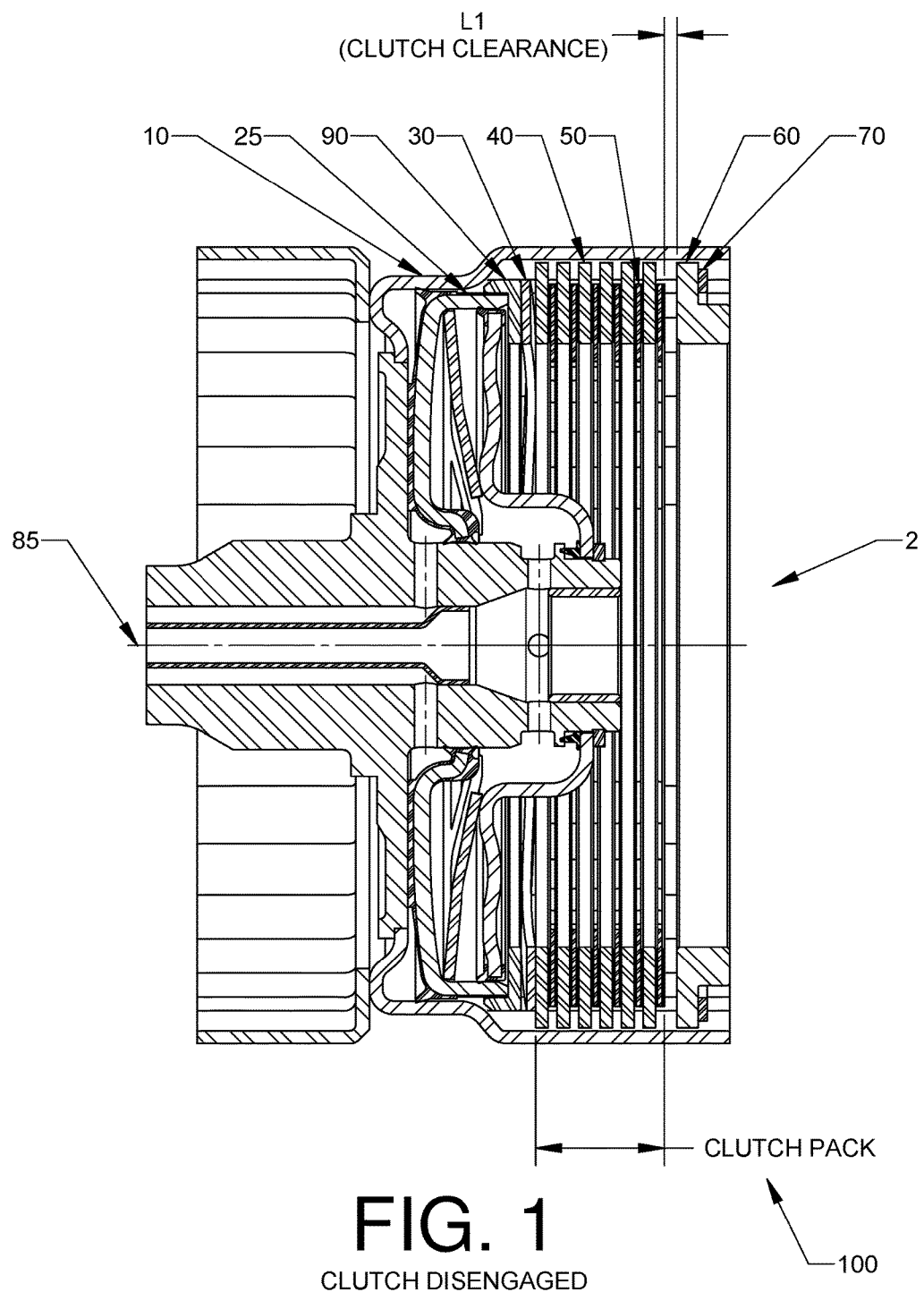
FIG. 1 is a cross sectional view depicting an example of a clutch apply piston with the clutch assembly shown in the disengaged mode according to an aspect of the present disclosure.
Figure 2:
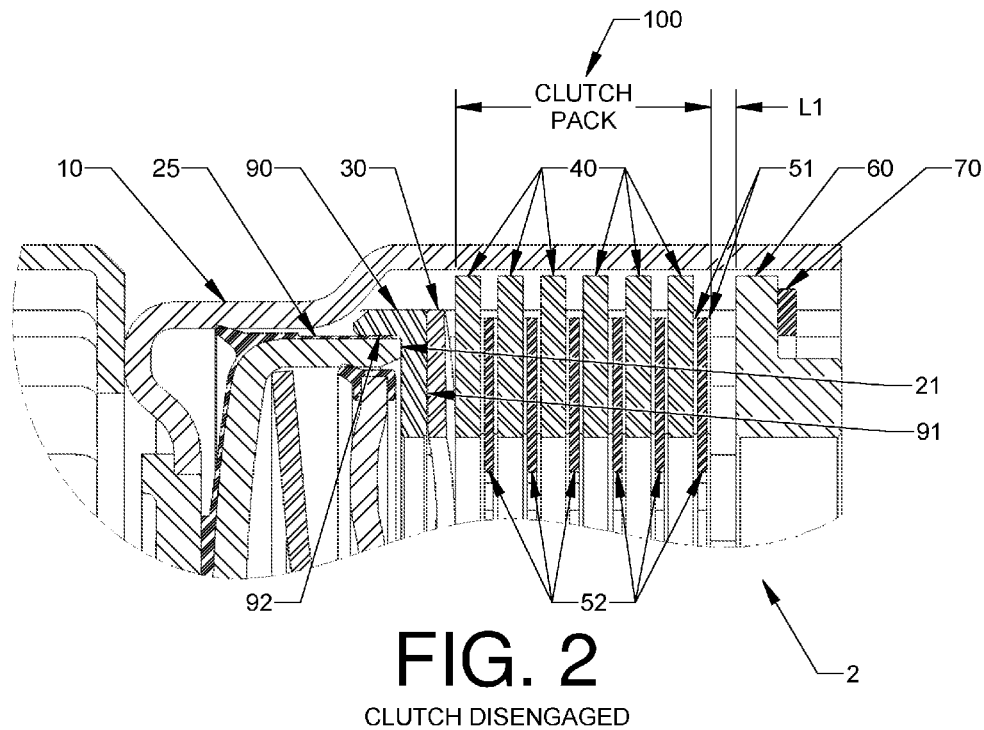
FIG. 2 is a partial and enlarged cross sectional view of the example clutch apply piston assembly shown in FIG. 1 with the clutch assembly shown in the disengaged mode.
Figure 3:
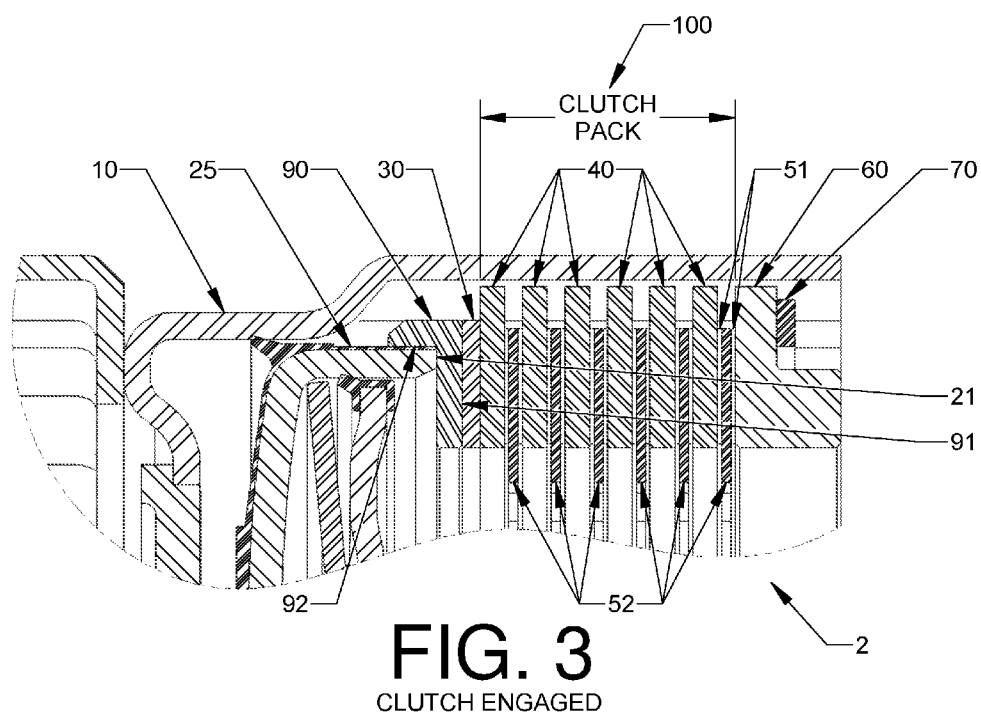
FIG. 3 is a partial and enlarged cross sectional view of the example clutch apply piston assembly shown in FIGS. 1 and 2 with the clutch assembly shown in the engaged mode.
Figure 6:
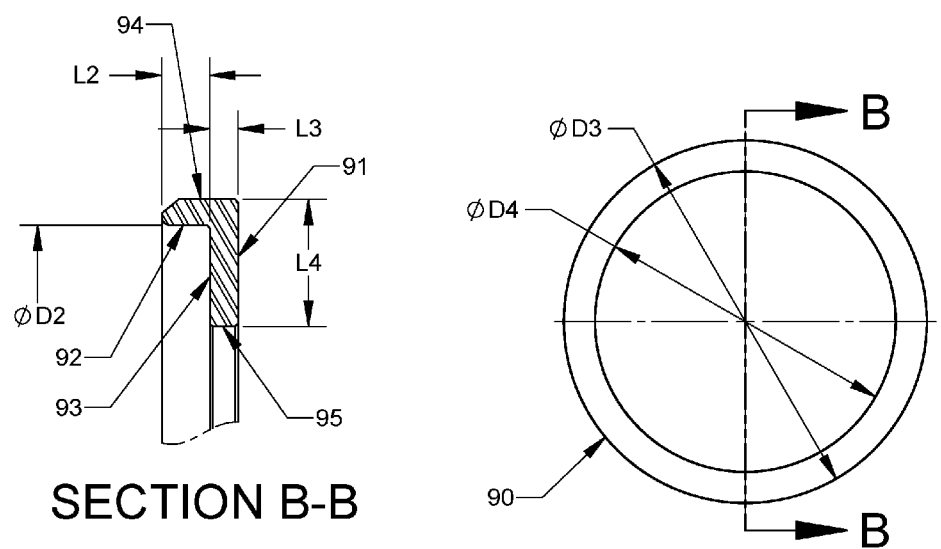
FIG. 6 depicts a plan view and enlarged partial cross sectional view of a clutch piston apply ring that is part of the example clutch apply piston assembly shown in FIG. 1.
Figure 7:
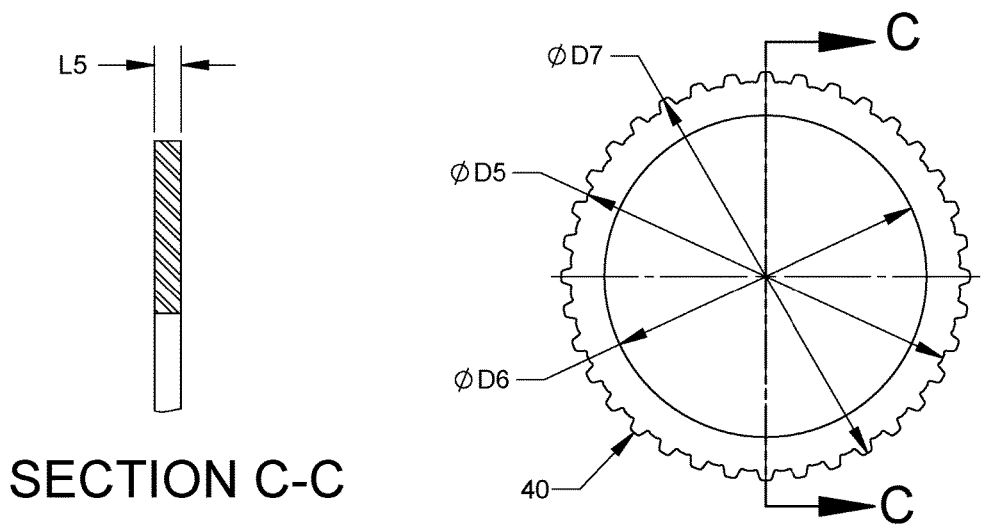
FIG. 7 depicts a plan view and enlarged partial cross sectional view of a clutch reaction plate that is part of the example clutch apply piston assembly shown in FIG. 1.
Figure 8:
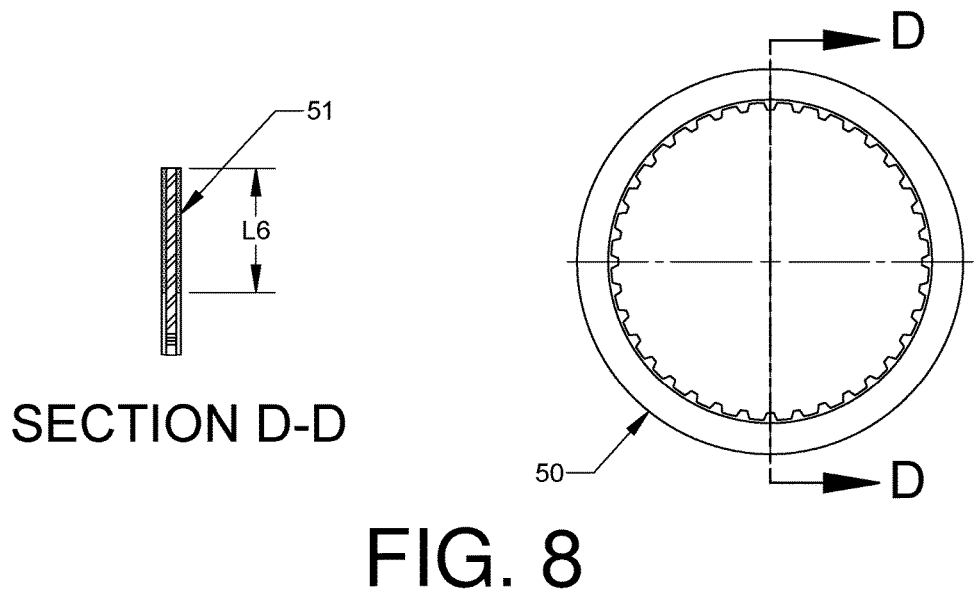
FIG. 8 depicts a plan view and enlarged partial cross sectional view of a clutch friction plate that is part of the example clutch apply piston assembly shown in FIG. 1.
Figure 9:
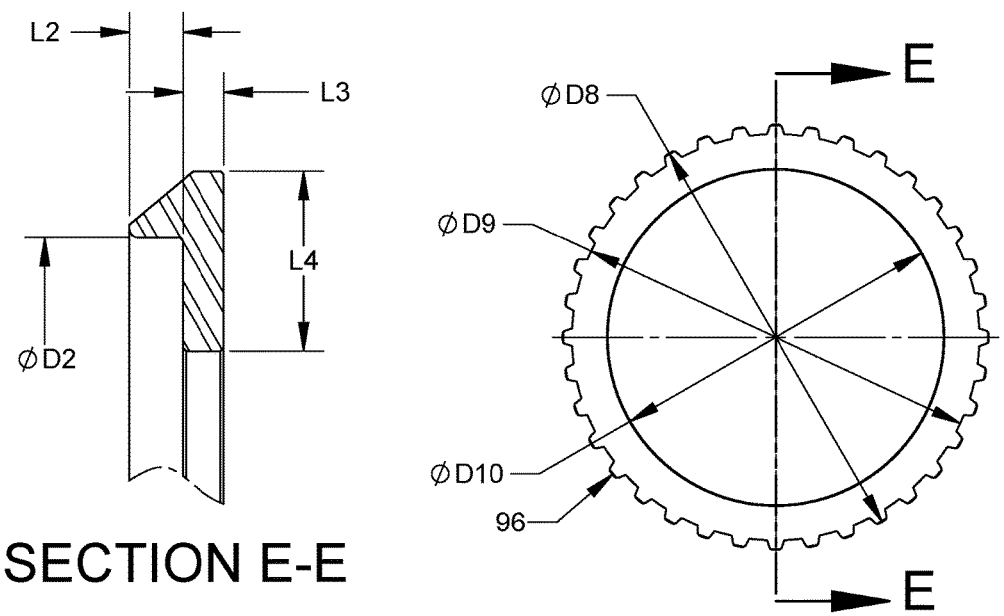
FIG. 9 depicts a plan view and enlarged partial cross sectional view of an alternative clutch piston apply ring.
Figure 10:
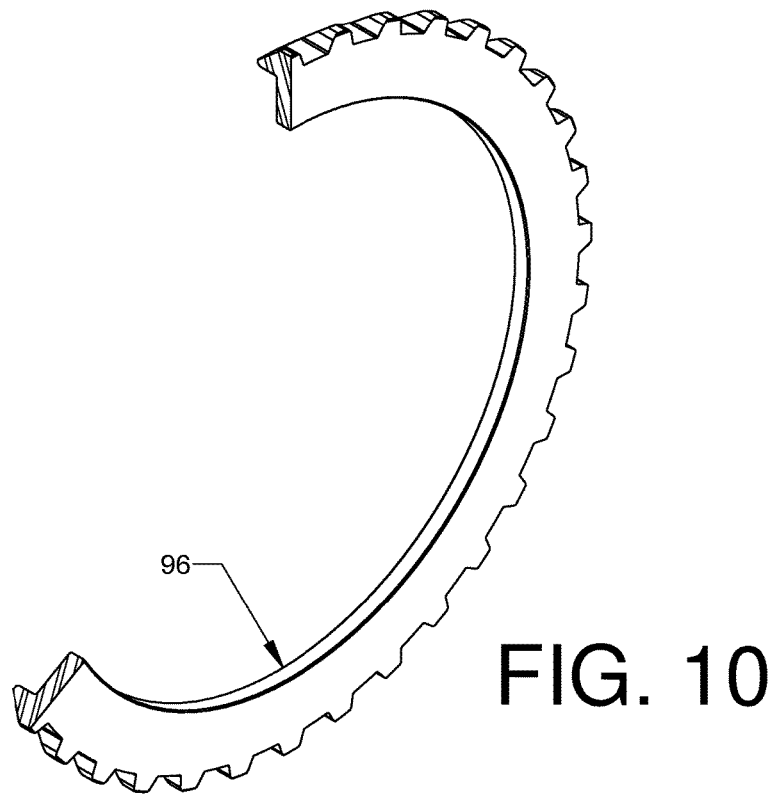
FIG. 10 depicts an isometric cutaway view of the clutch piston apply ring shown in FIG. 9.

FIGS. 1-3 illustrate an example clutch assembly having an improved clutch apply piston assembly. FIG. 1 shows clutch assembly 2 in the disengaged mode of operation, FIG. 2 shows an enlarged view of clutch assembly 2 in the disengaged mode of operation, and FIG. 3 shows an enlarged view of clutch assembly 2 in the engaged mode of operation. Clutch assembly 2 includes a clutch housing 10, clutch apply piston 25, clutch apply cushion plate 30, multiple clutch reaction plates 40, multiple clutch friction plates 50, backing plate 60, and backing plate retaining ring 70. Unlike example assembly 1 shown in FIGS. 13 and 14, example assembly 2 includes a piston apply ring 90 (see also FIG. 6). In alternative embodiments, improved assemblies made in accordance with the present disclosure may not have a clutch apply cushion plate 30. Piston apply ring 90 provides a more uniform load distribution from clutch apply piston 25 to clutch reaction plates 40 and reduces hot spotting. The L-shaped cross-sectional shape of apply ring 90 helps locate the apply ring on clutch apply piston 25 and prevents torsional movement between the apply ring and the clutch apply piston.

In some embodiments, clutch apply piston 25 may have a reduced depth (e.g., a shorter piston than a factory-installed piston may be manufactured or an original piston may be modified) such that the combined axial (or stack-up) extent or distance along central axis 85 of clutch apply piston 25 and piston apply ring 90 is equivalent (or substantially equivalent, i.e., within 5% or 10% of the distance) to the axial extent of prior art (e.g., factory-installed) clutch apply piston 20. For example, this difference can be seen by comparing the axial extent of clutch apply piston 25 in FIG. 1 with the axial extent of prior art clutch apply piston 20 in FIG. 13 relative to, e.g., the axial extent of clutch housing 10. In some embodiments, apply ring 90 may be bolted or otherwise physically attached to or formed integrally with an optionally modified version of clutch apply piston 25; in this case, the material between apply ring cylindrical surface 92 and apply ring cylindrical surface 94 (see FIG. 6) may be minimized (such that apply ring cylindrical surface 92 is reduced in total area, i.e., length L2 is reduced) or eliminated. In some embodiments, clutch apply cushion plate 30 may be made thicker than prior art clutch apply cushion plates (e.g., 1.2× or larger than the thickness of a factory-installed apply cushion plate), and, additionally or alternatively, in some embodiments, more than one clutch apply cushion plate 30 may be used; in these implementations, piston apply ring 90 may be minimized (e.g., one or more dimensions, such as L2, L3, and/or L4) or eliminated.

When clutch assembly 2 is in the engaged mode, as depicted in FIG. 3, force is applied axially to clutch pack 100 via clutch apply piston 25. As the force is applied, piston apply ring 90, clutch apply cushion plate 30, and clutch pack 100 translate axially until resisted by backing plate 60. Rotation and axial translation of the clutch assembly components occur about and along central axis 85. In the example embodiment shown in FIGS. 1-3, the clutch apply piston assembly is designed and configured to minimize distortion of the associated clutch assembly components, in particular the clutch reaction plates 40 and friction plates 50. By minimizing distortion, clutch apply forces are more evenly distributed at mating clutch plate contact faces, thereby improving clutch performance and reducing the likelihood of premature clutch failure due to excessive heat.

With reference to FIGS. 1-8 of the example embodiment, piston apply ring 90 serves as an intermediate component between clutch apply piston 25 and clutch apply cushion plate 30 and/or clutch pack 100 (in those instances where clutch apply cushion plate 30 is not used or required). Apply ring 90 may be a steel component and may be machined from a steel bar on a turning lathe, for example, forged or cast into a steel ring that is subsequently machined as required, or formed from steel sheet. After reading this disclosure in its entirety, those of ordinary skill in the art will recognize that various other materials and methods of manufacturing or combinations of materials and methods of manufacturing can be used to produce piston apply ring 90 without undue experimentation, such as ceramics, polymers, additive or subtractive manufacturing, etc.

Functionally, and with reference to FIGS. 2, 3, 5 and 6, planar surface 91 of apply ring 90 contacts the corresponding mating surfaces of clutch apply cushion plate 30 or clutch pack 100 (application specific). Apply ring cylindrical surface 92 (diameter D2; see FIG. 6) radially locates apply ring 90 via a locational clearance fit with cylindrical surface 22 (diameter D1; see FIG. 5) of clutch apply piston 25. In some embodiments, one or more teeth or friction materials may be included on cylindrical surface 92 or planar surface 93 of apply ring 90 in order to prevent radial movement of the apply ring relative to clutch apply piston 25, in which case corresponding grooves or materials may be included on cylindrical surface 22 and/or planar surface 21 of the clutch apply piston. Apply ring planar surface 93 makes contact with and axially locates apply ring 90 on corresponding mating planar surface 21 of apply piston 25. The external diameter of clutch apply ring 90 (diameter D3; see FIG. 6), defined by apply ring cylindrical surface 94, is sized to clear the minor diameter of the internal teeth of clutch housing 10, although in alternative embodiments the apply ring may be designed and configured to engage the internal teeth of the clutch housing. Apply ring cylindrical surface 95 (diameter D4; see FIG. 6) is sized to clear the major diameter of the external teeth of an inner driven member (not shown for clarity) and to clear any other interfering internal feature or component, although in alternative embodiments the apply ring may be designed and configured to engage the external teeth of an inner driven member.

Figure 4:
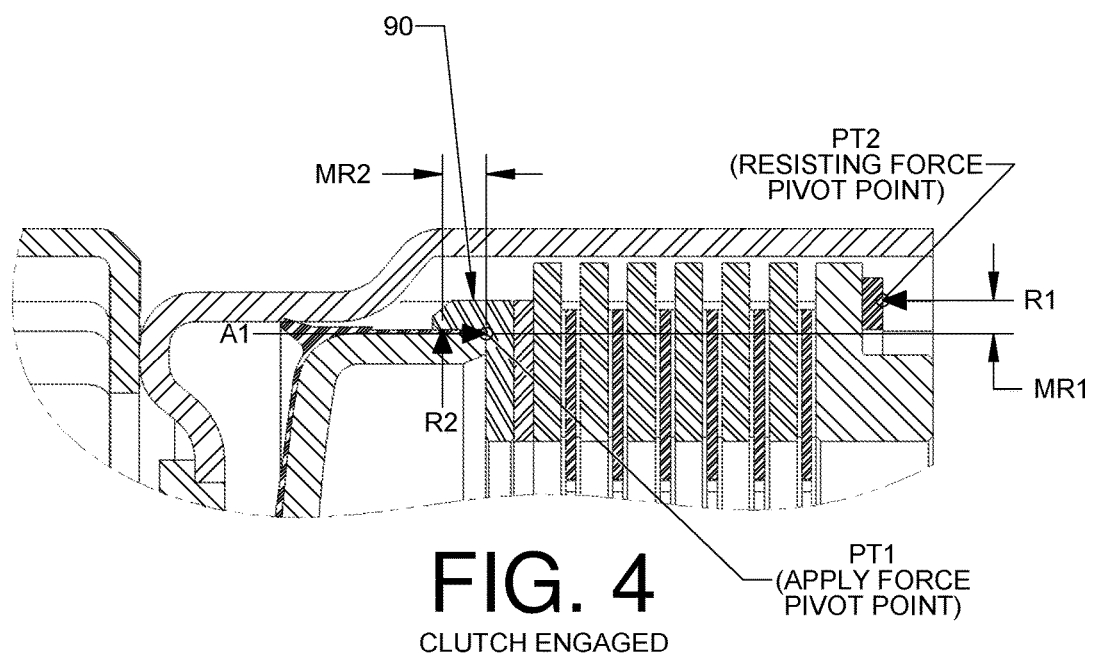
FIG. 4 is a partial and enlarged cross sectional view of the example clutch apply piston assembly shown in FIGS. 1-3 with the clutch assembly shown in the engaged mode and illustrating locations of applied and reaction forces.
Figure 5:
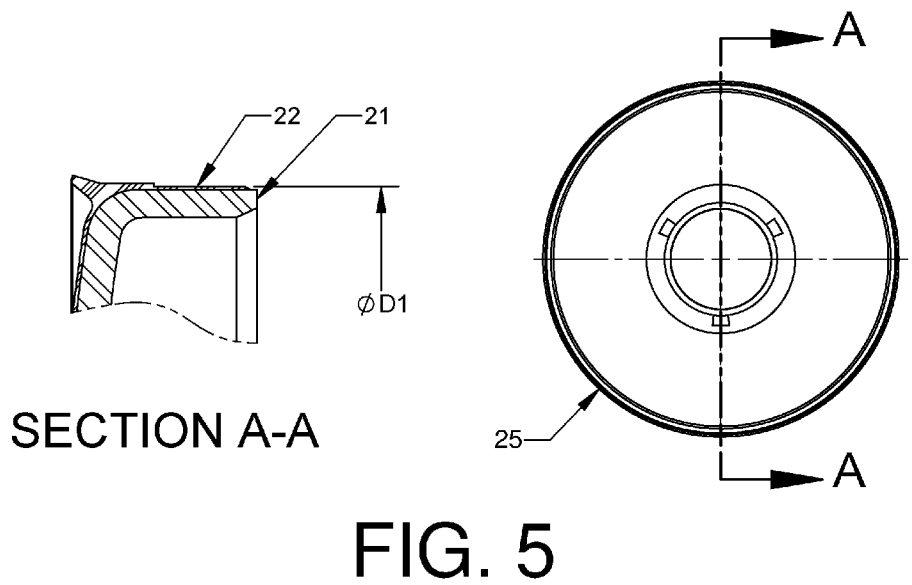
FIG. 5 depicts a plan view and enlarged partial cross sectional view of a clutch apply piston that is part of the example clutch apply piston assembly shown in FIG. 1.

As compared to the prior art clutch apply piston assembly 1 of FIGS. 13 and 14, clutch piston apply ring surface 91 provides a significant increase in contact surface area with clutch apply cushion plate 30 and/or clutch pack 100. With reference to FIG. 4, clutch apply piston force A1 is distributed over a larger surface as it makes contact with the cushion plate and/or clutch pack. This serves to more evenly distribute the apply forces as opposed to being concentrated in a narrow band, as is the case with clutch apply piston assembly 1. The result of this distribution of force is a reduction in the likelihood of clutch plate hot-spotting, coning, and/or pringling that may otherwise occur due to large temperature differentials across the faces of and within reaction plates 40 and friction plates 50. In addition, any tendency for apply ring 90 and/or other clutch plates to conically deflect due to clutch piston apply force A1 and reaction force R1 at distance MR1 is resisted by the torsional reaction moment generated by reaction force R2 at distance MR2 through contact of apply ring cylindrical surface 92 with apply piston cylindrical surface 22. All of these features and characteristics contribute to a reduction in clutch plate distortion.

Figure 11:
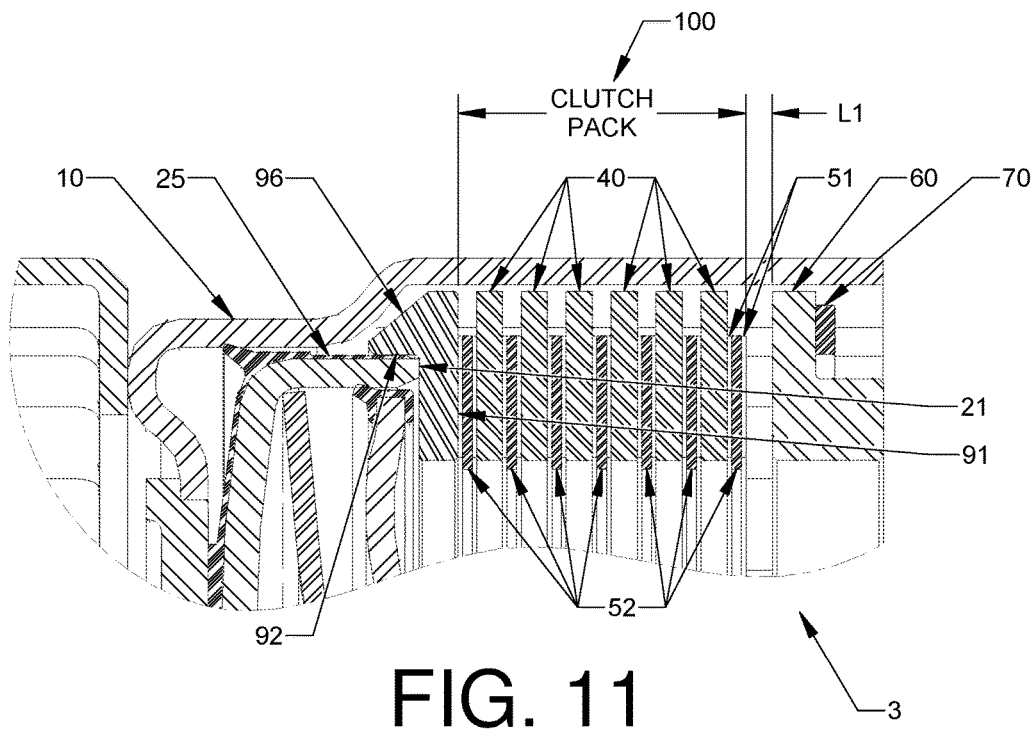
FIG. 11 is a partial and enlarged cross sectional view of an example clutch apply piston assembly using the alternative clutch piston apply ring of FIGS. 9-10 with the clutch assembly shown in the disengaged mode.
Figure 12:
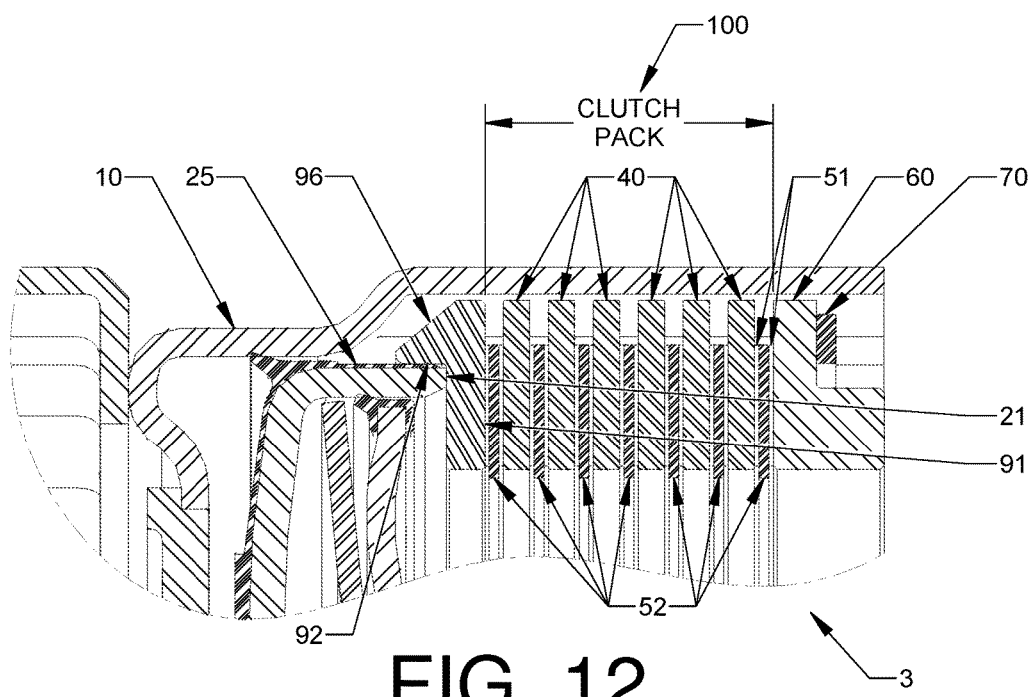
FIG. 12 is a partial and enlarged cross sectional view of the example clutch apply piston assembly shown in FIG. 11 with the clutch assembly shown in the engaged mode.

In the example embodiment depicted in FIGS. 1-6, illustrated piston apply ring 90 has an annular ring shape and is designed and configured to mate with clutch apply piston 25 with no features to prevent rotation about central axis 85. However, as alluded to above, in some embodiments, piston apply ring 90 may be configured to engage one or more components of a clutch assembly, such as internal teeth of a clutch housing or external teeth of a driven member, e.g., via internal or external teeth or friction materials included on the piston apply ring. An example of such an embodiment is illustrated in FIGS. 9-12 as piston apply ring 96. FIGS. 11 and 12 illustrate an example clutch apply piston assembly 3 using piston apply ring 96, allowing for use of an additional clutch friction plate 50, which increases the clutch's torque capacity over that of clutch assembly 2. It should be noted that piston apply ring 96 is depicted with a full complement of external teeth, equal to the number of mating internal teeth in clutch housing 10. However, as few as one or two external teeth (which, in the case of two teeth, may be directly opposed to each other on the perimeter of the apply ring) may be sufficient to prevent rotation of piston apply ring 96. In some embodiments, such as those using an additional clutch friction plate, one or more friction materials may be included on the side of apply ring 96 facing the additional clutch friction plate.

With reference to FIGS. 1-10, additional dimensional and proportional parameters for the exemplary embodiments disclosed herein are disclosed in Table I.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

TABLE I

| Variable | Definition | Units (ref) | Value |
|---|---|---|---|
| D1 | Outside diameter of clutch apply piston 25 (mates with piston apply rings 90 and 96) | in | Application specific |
| D2 | Locating diameter of piston apply rings 90 and 96 (mates with clutch apply piston 25) | in | Locational clearance fit with D1 |
| D3 | Outside diameter of piston apply ring 90 | in | D3 ≈ D5 ≈ D9 |
| D4 | Inside diameter of piston apply ring 90 | in | D4 ≈ D6 ≈ D10 |
| D5 | Minor diameter of spline teeth on clutch reaction plate 40 | in | Application specific |
| D6 | Inside diameter of clutch reaction plate 40 | in | Application specific |
| D7 | Major diameter of spline teeth on clutch reaction plate 40 | in | Application specific |
| D8 | Major diameter of spline teeth on piston apply ring 96 | in | D8 ≈ D7 |
| D9 | Minor diameter of spline teeth on piston apply ring 96 | in | D9 ≈ D5 ≈ D3 |
| D10 | Inside diameter of piston apply ring 96 | in | D10 ≈ D6 ≈ D4 |
| L1 | Clutch clearance (clutch disengaged) | in | Application specific |
| L2 | Length of locating diameter D2 on piston apply rings 90 and 96 (engagement length with clutch apply piston 25) | in | L2 ≥ 2 * L1 |
| L3 | Thickness of flange on piston apply rings 90 and 96 | in | L3 ≥ 0.080 ≥ L5 |
| L4 | Width of flange contact surface on piston apply rings 90 and 96 | in | L4 ≥ L6 (in) |
| L5 | Thickness of clutch reaction plate 40 | in | Application specific |
| L6 | Width of contact surface of friction material 51 on clutch friction plates 50 | in | L6 ≥ L4 |
| A1 | Clutch piston apply force | lb | Application specific |
| R1 | Reaction force resisting clutch apply force A1 | lb | R1 = A1 |
| R2 | Reaction force resisting torsional moment produced in piston apply rings 90 and 96 as a result of clutch piston apply force A1 | lb | Application specific |
| MR1 | Radial distance from point of application of clutch piston apply force A1 to point of application of reaction force R1 | in | MR1 ≤ MR2 |
| MR2 | Axial distance from point of application of torsional reaction force R2 to point of application of clutch piston apply force A1 | in | MR2 ≥ MR1 |
| PT1 | Point of application of clutch piston apply force A1 (pivot point for clutch plate coning as a result of applied force A1) | in | Application specific |
| PT2 | Point of application of reaction force R1 (pivot point for clutch plate coning as a result of applied force A1) | in | Application specific |

What is claimed is:

1. A kit for minimizing or eliminating clutch plate distortion in a hydraulically actuated clutch assembly, the clutch assembly including a first hydraulic apply piston designed and configured to be translated along a central axis to bear against a cushion plate disposed between said first hydraulic apply piston and a clutch pack of said clutch assembly to apply said clutch, the kit comprising:

a piston apply ring, said piston apply ring comprising an annular portion having a central longitudinal axis, an outer diameter, an inner diameter, an apply piston side and a clutch pack side, and a cylindrical portion extending from the apply piston side of the annular portion and having an inner diameter that is greater than the annular portion inner diameter; and a second hydraulic apply piston designed and configured to bear against the annular portion of the apply piston side of the piston apply ring, wherein said piston apply ring and said second hydraulic apply piston have a combined axial dimension along the central axis after being installed in the clutch assembly in place of the first apply piston is at least substantially equivalent to the axial dimension of the first apply piston along the central axis when the first hydraulic apply piston is installed in the clutch assembly without the piston apply ring and second apply piston, and wherein said second hydraulic apply piston in combination with said apply ring provide an increase in contact surface area with the cushion plate or clutch pack when installed in the clutch assembly as compared to the first hydraulic apply piston.

2. A kit according to claim 1, wherein the second apply piston has an outer diameter and a contact surface for applying force to the clutch pack, and wherein the clutch pack side of the annular portion has a surface area that is greater than the contact surface of the second apply piston, the piston apply ring being configured to uniformly transmit a force from the second apply piston to the clutch pack.

3. A kit according to claim 2, wherein a surface of the cylindrical portion of the piston apply ring is designed and configured to radially locate the piston apply ring relative to the second apply piston.

4. A kit according to claim 2, wherein a surface of the annular portion of the piston apply ring is designed and configured to axially locate the piston apply ring relative to the second apply piston.

5. A kit according to claim 1, wherein the piston apply ring includes one or more features on an outer surface of the ring for preventing relative rotational movement between the piston apply ring and the second apply piston.

6. A kit according to claim 5, wherein the clutch assembly includes a clutch pack, the kit further comprising a clutch friction plate designed and configured to be installed in the clutch assembly between the piston apply ring and the clutch pack.

7. A kit according to claim 5, wherein the features include one or more teeth.

8. A kit for minimizing or eliminating clutch plate distortion in a hydraulic clutch assembly, the hydraulic clutch assembly including a first hydraulic apply piston designed and configured to be translated along a central axis and apply force to a clutch pack having clutch plates and a backing plate, the kit comprising:

a piston apply ring; and a second hydraulic apply piston designed and configured to, in combination with the piston apply ring, replace the first hydraulic apply piston, said second hydraulic apply piston having an outer diameter and a contact surface for applying force to the clutch pack, wherein
the piston apply ring comprises:
an annular portion having a central longitudinal axis, an outer diameter, an inner diameter, an apply piston side and a clutch pack side; and
a cylindrical portion extending from the apply piston side of the annular portion and having an inner diameter that is greater than the annular portion inner diameter and substantially the same as the second apply piston outer diameter;

the clutch pack side of the annular portion has a contact surface area that is greater than the contact surface of the second apply piston, the piston apply ring being configured to be disposed between and uniformly transmit force from the second apply piston to the clutch pack; and the piston apply ring and the second hydraulic apply piston have a combined axial dimension along the central axis after being installed in the clutch assembly in place of the first apply piston is substantially equivalent to the axial dimension of the first apply piston along the central axis when the first hydraulic apply piston is installed in the clutch assembly without the piston apply ring and second hydraulic apply piston.

9. A kit according to claim 8, wherein said second hydraulic apply piston in combination with said apply ring provide an increase in contact surface area with the clutch pack when installed in the clutch assembly as compared to the first hydraulic apply piston.

10. A kit according to claim 8, wherein the piston apply ring is designed and configured to reduce temperature differentials in the clutch plates to thereby reduce clutch plate bending as compared to clutch assemblies including the first hydraulic apply piston.

11. A kit according to claim 8, wherein the cylindrical portion of the piston apply ring is designed and configured to provide a torsional reaction moment that counteracts a moment created by the second apply piston force not being aligned with the backing plate reaction force, thereby preventing clutch plate distortion.

12. A kit according to claim 8, wherein the piston apply ring includes one or more features on an outer surface of the ring for preventing relative rotational movement between the piston apply ring and the second apply piston.

13. A kit according to claim 12, wherein the features include one or more teeth.

14. A kit according to claim 8, wherein a surface of the cylindrical portion of the piston apply ring is designed and configured to radially locate the piston apply ring relative to the second apply piston.

15. A kit according to claim 8, wherein a surface of the annular portion of the piston apply ring is designed and configured to axially locate the piston apply ring relative to the second apply piston.

* * * * *